(12) United States Patent
Parulski

(10) Patent No.: US 6,400,908 B1
(45) Date of Patent: *Jun. 4, 2002

(54) CAMERA AND PHOTOGRAPHY SYSTEM WITH MULTIPLE, ENCODED AREA MODES AND MODIFICATION STATES

(75) Inventor: Kenneth A. Parulski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/519,117

(22) Filed: Mar. 6, 2000

Related U.S. Application Data

(63) Continuation of application No. 09/157,195, filed on Sep. 18, 1998, now Pat. No. 6,072,962.

(51) Int. Cl.[7] .......................... G03B 17/24; G03B 17/48
(52) U.S. Cl. ....................... 396/311; 396/374; 396/378; 396/429; 348/333; 348/64
(58) Field of Search .............................. 396/6, 311, 374, 396/378, 429, 315, 319; 348/64, 333, 334; 358/909.1

(56) References Cited

U.S. PATENT DOCUMENTS

| | | |
|---|---|---|
| 4,345,825 A | 8/1982 | Matteson et al. |
| 4,423,934 A | 1/1984 | Lambeth et al. |
| 5,142,310 A | 8/1992 | Taniguchi et al. |
| 5,189,453 A | 2/1993 | Boyd |
| 5,300,974 A | 4/1994 | Stephenson, III |
| 5,504,583 A | 4/1996 | Jamzadeh et al. |
| 5,587,752 A | 12/1996 | Petruchik |
| 5,606,365 A | 2/1997 | Maurinus et al. |
| 5,619,737 A | 4/1997 | Horning et al. |
| 5,619,738 A | 4/1997 | Petruchik et al. |
| 5,640,201 A | 6/1997 | Inuiya |
| 5,701,529 A | 12/1997 | Yokonuma et al. |
| 5,701,530 A | 12/1997 | Fujino |
| 5,726,737 A | 3/1998 | Fredlund et al. |
| 5,739,922 A | 4/1998 | Matama |
| 5,742,855 A | 4/1998 | Saito et al. |
| 5,758,216 A | 5/1998 | Arnold |
| 5,761,558 A | 6/1998 | Patton et al. |
| 5,799,219 A | 8/1998 | Moghadam et al. |
| 6,070,013 A * | 5/2000 | Cosgrove et al. ............... 396/6 |
| 6,072,962 A * | 6/2000 | Parulski ...................... 396/311 |
| 6,097,901 A * | 8/2000 | Parulski ...................... 396/311 |

FOREIGN PATENT DOCUMENTS

| | | |
|---|---|---|
| EP | 0 821 265 A1 | 1/1998 |
| JP | 9-179250 | 7/1997 |
| JP | 10-115874 | 5/1998 |
| JP | 10-115875 | 5/1998 |

OTHER PUBLICATIONS

1998 Nintendo Brochure, "Funtography".

* cited by examiner

Primary Examiner—Alan A. Mathews
(74) Attorney, Agent, or Firm—Robert Luke Walker

(57) ABSTRACT

A camera and photography system have multiple, encoded area modes and modification states. The camera has a case, a taking lens that defines an image plane in the case, and a capture member for capturing a series of images formed by the taking lens at the image plane. The camera has an area designator that identifies a plurality of different areas of the image plane and is switchable to designate a selected area, and a modification designator that is switchable among a plurality of image modification states to designate a selected state. An encoder records the selected area and selected state concurrent with image capture.

25 Claims, 8 Drawing Sheets

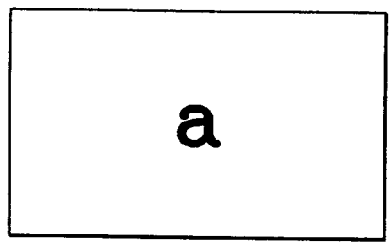
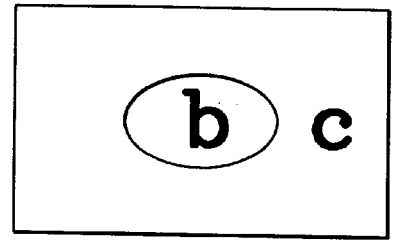
FIG. 2  FIG. 3
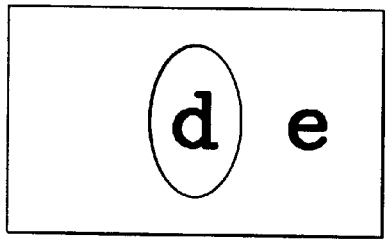
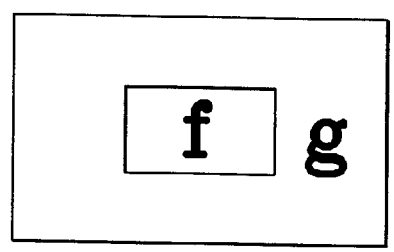
FIG. 4  FIG. 5
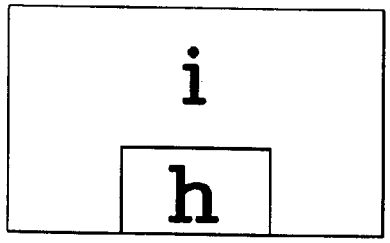
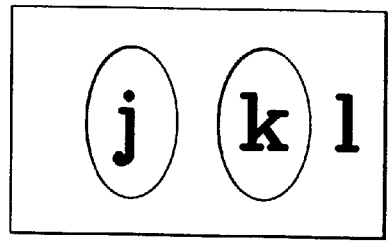
FIG. 6  FIG. 7

CAMERA AND PHOTOGRAPHY SYSTEM WITH MULTIPLE, ENCODED AREA MODES AND MODIFICATION STATES

CROSS REFERENCE TO RELATED APPLICATIONS

This is a continuation application of U.S. Ser. No. 09/157,195 filed Sep. 18, 1998, now U.S. Pat. No. 6,072,962.

Reference is made to commonly assigned, U.S. patent application Ser. No. 09/157,194, entitled: TRANSMOGRIFYING PHOTOGRAPHY SYSTEMS, FILM PACKAGES, AND CAMERAS, filed in the names of Patrick A. Cosgrove and Kenneth A. Parulski, now U.S. Pat. No. 6,070,013; U.S. patent application Ser. No. 09/156,681, entitled: CAMERA HAVING LOCATOR FOR IMAGE MODIFICATION AREAS, filed in the name of Kenneth A. Parulski, now U.S. Pat No. 6,097,901, each of which is hereby incorporated herein by reference.

FIELD OF THE INVENTION

The invention relates to photography and photographic systems and more particularly relates to non-realistic photography systems, film packages, and cameras.

BACKGROUND OF THE INVENTION

The term "one-time use camera" is used herein to refer to cameras that are provided to consumers in preloaded form and cannot be reloaded, by the consumer, without extensive camera disassembly, or replacement of parts, or use of special tools, or the like. One-time use film cameras are widely available at this time. Digital one-time use cameras are limited at this time, for cost reasons, to use in controlled situations in which it can be assured that the used camera will be returned to the dealer or manufacturer for reloading.

It is ordinarily the object of photography to make printed or displayed images that reproduce a visual image. Images are sometimes modified for creative purposes, either at the time of capture using a modified optical system; or after capture by digital or physical manipulation of the captured image. The use of filters and other optical modifiers is well known, but it requires considerable skill to produce a desired effect. Digital image modification software is widely available that allows a user to modify a digital image. An example of such software is marketed as Kai Power Goo by Meta-Creations Corporation of Carpinteria, Calif. The digital image modification software can modify digital images, by causing aberration or remapping colors or both, globally or locally as desired. Local areas and specific modifications are identified during editing. Such image modification software requires the use of computer, some level of knowledge on the part of the user, and some means of both inputting a digital image and outputting the modified image in print media or other form. It is generally very easy, with such software, to either make a minor change or to work a very great alteration that turns a realistic photograph into a work of abstract art. It is generally much more difficult to obtain a controlled result. Thus, in view of this and the costs involved, digital image transmogrification is not suitable for a great many casual photographers. Digital image modification software also presents the problem that the image editing is completely separate from image capture. If a user wants to capture images appropriate for a particular transmogrification, then the user must mentally visualize the modified image while shooting the picture.

A variety of photographic systems have been described, for example, in U.S. Pat. Nos. 4,650,304; 4,583,831; 5,059,993; 5,619,738; and 5,132,715, in which images are automatically zoomed to a greater magnification or cropped (use of only part of the image) or both during processing, based on a predetermined or selected encodement. (The term "processing" used herein, refers to the preparation of prints or other viewable images and is inclusive of printing, unless the context indicates otherwise.) In the Advanced Photo System™ (APS™), latent images are captured in a standard format (also referred to as "H" format) and are printed in that format or are printed in one of two other formats (referred to as "C" and "P"), depending upon a magnetic or optical encodement on the film.

Cameras commonly have viewfinder masks or markings to indicate to the user the dimensions of the selected photograph. Viewfinders and viewfinder components which aid in capturing non-standard images are described, for example, in U.S. Pat. Nos. 4,583,831; 4,650,304; 5,587,755; 5,619,737; 5,619,738; and Reissue U.S. Pat. No. 32,797. Such masks are fixed for single mode one-time use cameras, which have external indicia indicating the particular mode. The masks are movable between different masking positions for multiple mode reusable and one-time use cameras. The cameras have indicia to inform the user of a selected mode.

U.S. Pat. No. 5,758,216 discloses photography systems, film packages, and cameras in which a one-time use camera or film package bears external indicia of a special promotion and the enclosed film has a corresponding magnetic encodement. Disclosed special promotions include photomontages (composite images) with pre-exposed or digitally superimposed cartoon characters and other symbols, super saturated color processing and enhanced size prints. The viewfinder of the one-time use camera can be modified to indicate the position of the cartoon character or the like in the photomontaged final prints. An overlay can be provided to temporarily modify the viewfinder of a reusable camera. The composited images of U.S. Patent No. 5,758,216 discard part of the field of view of the camera (by masking or digital manipulation) and replace the discarded part with a predetermined image component. The non-replaced part of the resulting image is orthoscopic, that is, carries the same information as the original light image, within the limits of the imaging system.

The zoomed and cropped and composited final images just described are realistic, that is, within the quality tolerances of the equipment used, the final images do not markedly differ from visible images reflected or transmitted from the subject matter photographed. In the case of composite images, two photographic exposures are physically combined by masking the second exposure or the same effect is produced digitally, but both images are realistic prior to photomontage (or in the case of a digital component would be realistic if viewed from a display or printout). The resulting final images are realistic. Part of the original image is discarded either by masking part of the image during capture or physically or digitally removing part of the image during processing. Masking can be provided by a translucent feature such that two superimposed features appear in the final image. These types of image modification that zoom, crop, rotate, or photomontage, or do some combination of these; but do not otherwise alter the non-discarded image information; are referred to herein as "orthoscopic modifications". (Image reduction rather than enlargement is uncommonly used, but is also within the scope of "orthoscopic modification". In this case, the discarded information is uniformly distributed over the image within the limits of film grain, printer resolution, and the like.) Other modifications that alter non-discarded image information, such as image aberration and color remapping, are categorized herein as "non-orthoscopic modifications".

U.S. Pat. No. 5,726,737 discloses photography systems, film packages, and cameras in which a one-time use camera or film package bears external indicia of a preferential subject matter; such as action shots, scenic shots, and close-ups; and the enclosed film has a corresponding magnetic encodement. U.S. Pat. Nos. 5,758,216 and 5,726,737 disclose non-orthoscopic image modification of the entire image to provide for super saturated prints and preferential subject matter respectively. U.S. Pat. No. 5,461,440 discloses non-orthoscopic image modification that uses an encodement on film and corrects for particular image quality degradations.

U.S. Pat. No. 5,323,204 discloses use of an encodement to provide changes in aspect ratio and indicates that encodements might permit enhancement of image quality beyond negative quality to compensate for film or camera based limitations, artifacts, or errors. Examples of enhancements are noise suppression, sharpness enhancement, and tone scale modification.

It would thus be desirable to provide cameras and photography systems which allow a user to select, at the time of image capture, an image modification and area of modification.

SUMMARY OF THE INVENTION

The invention is defined by the claims. The invention, in its broader aspects, provides a camera and a photography system. The camera has a case, a taking lens that defines an image plane in the case, and a capture member for capturing a series of images formed by the taking lens at the image plane. The camera has an area designator that identifies a plurality of different areas of the image plane and is switchable to designate a selected area, and a modification designator that is switchable among a plurality of image modification states to designate a selected state. An encoder records the selected area and selected state concurrent with image capture.

It is an advantageous effect of at least some of the embodiments of the invention that cameras and photography systems are provided which allow the user to select, at the time of image capture, an image modification and area of modification.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein:

FIGS. 2–7 are diagrammatical views of area modes defining geometric partitions of the image plane and respective indicia.

FIGS. 10–12 differ in locator position and capture setting.

DETAILED DESCRIPTION OF THE INVENTION

Figure 1:
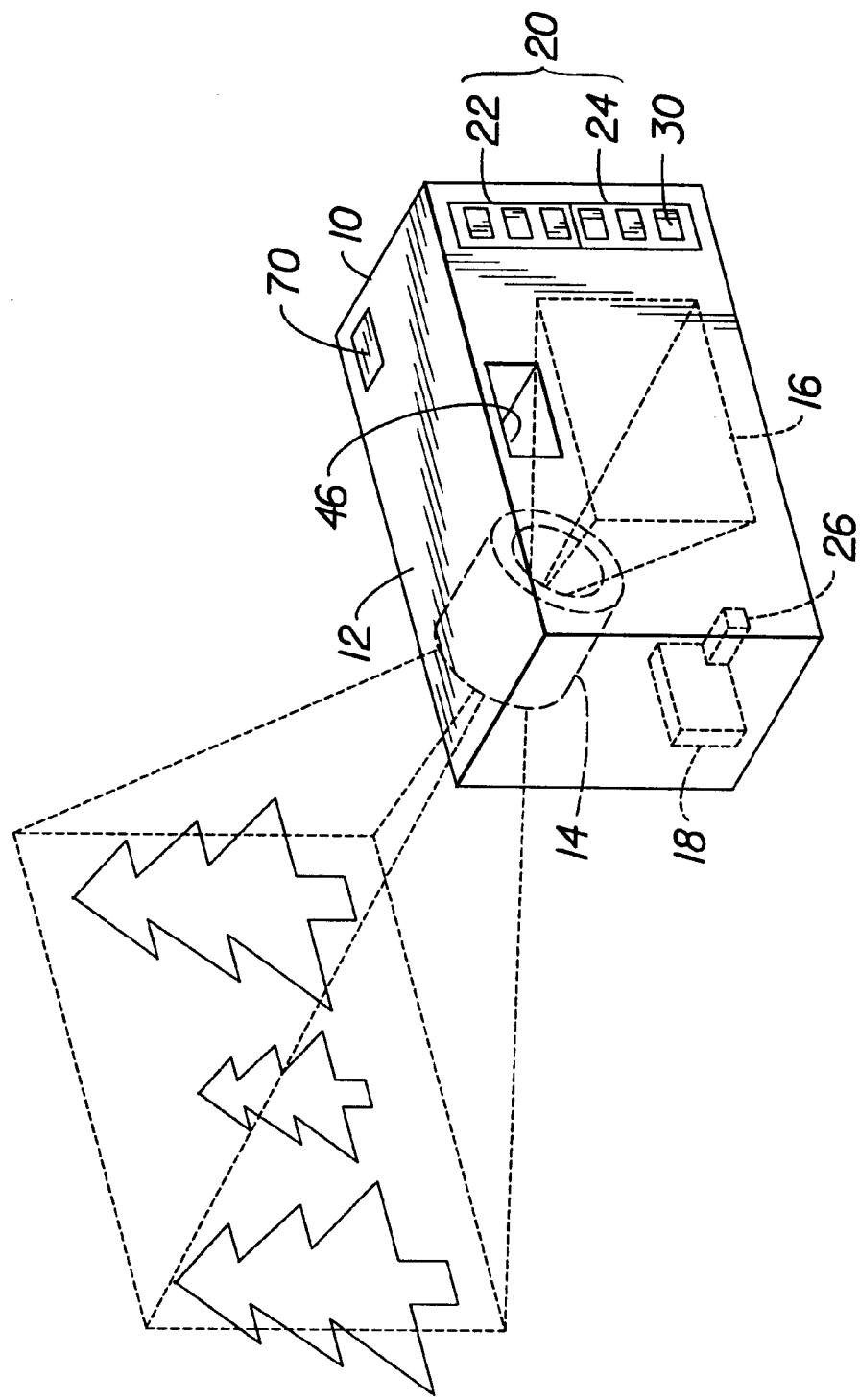
FIG. 1 is semi-diagrammatical view of the camera of the invention. A subject plane and image plane and projection lines are indicated by dashed lines. A capture member and encoder are also indicated by dashed lines.

FIG. 1 illustrates a camera 10 that is switchable among a plurality of image modification states and local and global area modes. The camera 10 has a case 12 and a taking lens 14 defining an image plane 16 in the case 12. A capture member 18 captures a series of images imaged by the taking lens 14 at the image plane 16. The capture member 18 can be a digital capture member, such as a floppy disc or memory card, in which images are stored in digital form in magnetic or optical storage media or electronic digital memory. The capture member 18 can also be a film member which uses photographic film, with or without a cassette. In this case, the camera 10 includes a film transporter (not shown) that transports the film, frame by frame, through the image plane for capture of a series of latent images on the frames of film.

The capture members 18 are conventional photographic film or digital storage media and capture images free of user selected image modification, that is, the images can be printed in a conventional manner, without modification to provide realistic images of the subject photographed. In the system 64 of the invention, the realistic captured images are altered, during final image preparation, to provide a final image exhibiting a selected image modification or modifications.

The camera 10 includes a selector 20. The selector 20 includes an area designator 22 that identifies a plurality of different areas of the image plane 16. The area designator 22 is switchable to select and designate a particular area of the image plane 16. The selector 20 includes a modification designator 24 that is switchable among a plurality of image modification states to designate a selected state. Detailed characteristics of the areas and image modification states are discussed below.

The selector 20 is operatively connected to an encoder 26 which records selected areas and image modification states concurrent with image capture as respective alteration settings. The nature of the recording is dependent upon the nature of the capture member 18. For example, an alteration setting can be magnetically or optically recorded on APS™ film. A alteration setting can be recorded as a simple encodement or in the form of instructions to automated equipment and can be recorded in physical association with a particular captured image or can be logically associated with the respective captured image. For convenience, recorded alteration settings are discussed below as encodements physically associated with respective captured images.

Each alteration setting identifies at least one area and an associated modification state. It is highly preferred, for reasons of ease of use, that the alteration setting designate an area in terms of a predefined area mode, and that the image modification states all be predefined.

Referring now particularly to FIGS. 2–7, the area modes identify predefined geometric partitions of the image plane into one or more areas (identified by letters in FIGS. 2–7) and corresponding geometric partitions of the captured and final images. For convenience, the partitions and their areas are generally discussed herein in terms of the image plane.

The area modes are either global or local. In the global area mode, shown in FIG. 2, the geometric partition has a single area that covers the entire image plane 16 or an entire captured image or entire final image or the like. In the various local area modes, such as those shown in FIGS. 3–7, the partitions each have two or more areas. (For convenience, areas of the local area modes are also referred to herein as "local areas".) Each local area represents only a portion of the image plane 16 and corresponding images. The areas of each local area mode are complementary and thus together map the entire image plane 16.

Local areas can be of any shape, but, for ordinary use, it is preferred that the local area modes each partition the image plane 16 into a subject area of simple shape and an background area taking up the rest of the image plane 16. This allows the user to line up foreground subject matter with the subject area and background with the background area. The subject area can be shaped to roughly match the shape of expected foreground subject matter. For example, FIGS. 3–7 illustrate area modes with centered-horizontal elliptical; centered-vertical elliptical; centered-rectangular; bottom-rectangular; and paired, vertical elliptical subject areas and complementary background areas. These local area modes are convenient for use in photographing, cars or pets (FIG. 3), individual faces (FIG. 4), and groups of people or objects (FIGS. 5–7), respectively. In FIGS. 2–5, the subject areas are all centered and fully surrounded by respective background areas. This is preferred for ease of use, but non-centered subject areas and multiple subject areas can also be used, as shown, for example in FIGS. 6–7.

The area designator 22 can be configured to designate an area mode, rather than individual areas. In this case, the area mode, as designated, includes one or more predetermined areas subject to modification. (Respective image modification states can also be predetermined, if desired.) The area designator 22 can alternatively be used to sequentially select an area mode and then to designate one or more areas of the respective partition subject to modification. Applicable image modification states can be preselected or selected later. An area designator 22 that also designates partitions is sometimes referred to herein as a "partition designator 22 a".

One or more image modification states are associated with each area designated by the area designator 22. It is preferred that two types of image modification states be provided: non-modifying and modifying. In non-modifying image modification states the image remains orthoscopic, that is, there is either no alteration of an original light image or the original light image is only altered by zooming or cropping or both prior to output of a final image. The non-modifying state or states do not exclude digital image modifications applied to captured images as a part of ordinary processing, such as digital inversion of colors as a part of digital printing from color film negatives. A plurality of non-modifying image modification states can be included, if desired to provide for different print formats or other zooming and cropping functions.

In modifying image modification states there is an image modification, that is, the image is non-orthoscopically altered prior to output of a final image. Each modifying image modification state includes one or more non-orthoscopic image modifications. Orthoscopic image modifications can also be included with non-orthoscopic modifications if desired. The nature of the non-orthoscopic image modification states provided is a matter of user preference and the practical limitations of printing equipment, such as color gamut. It is expected that one major preference for modification states other than the unmodified state will be for transmogrifications, cumulative effects of the image modification that are unsubtle (and often grotesque or humorous) and at the same time retain sufficient information content from the captured image so as to allow immediate user recognition of the subject matter originally captured. Another preference for modification states is expected to be for what can be referred to as "artistic effects", modifications that resemble stylistic changes in information content used in painting and other art forms. For general use, it is currently preferred that the camera 10 include a non-modifying image modification state corresponding to a camera "normal lens" mode and one or more modifying image modification states.

The image modifications and their areas of application are determined by the user selecting an alteration setting for the captured image. The camera can be set up to have a default alteration setting to which the selector returns after every exposure. The camera can also be set up to maintain a previous alteration setting until changed by the user. In any case, the selecting is concurrent with capture, that is, immediately before or after the capture event. Immediately before the capture event is preferred, because a user can then select an alteration setting while composing the picture. This is likely to change how a picture is composed and even whether a particular picture is taken. A alteration setting could also be set immediately after a capture event, and prior to a succeeding capture event; but this approach presents an undesirable risk that the user will become confused or forget to enter the setting. Any further delay is unacceptable, since it would increase this risk to the point that the benefit of selecting an alteration setting would be substantially lost.

The alteration settings apply one or more modification states to designated areas of the captured images. Alteration settings can provide predetermined combinations of image modification states and associated area modes. Alteration settings can alternatively be a combination of independently variable area modes and image modification states.

A alteration setting can have a single area (and area mode) and a image modification state for that area, such as, no modification for the area covering the entire image plane, or modifying the area of the entire image plane to provide a black and white image. An alteration setting can also have a single area mode with multiple areas and image modification states for each area. For example, an alteration setting can provide no modification for a rectangular subject area and a sepia tone for a background area. The alteration setting can also cover multiple area modes and modification states. For example, a alteration setting can provide a first capture mode with sepia in an oval subject area and no modification in the background in combination with a second capture mode with image inversion in the same oval subject area and no modification in the background region. (The two modifications, sepia and inversion, could also be combined in a single modification state.)

More than one local area mode can be used in a particular setting and areas can be subject to multiple image modification states; however, in many cases, not all combinations of area modes and image modification states will be possible at the same time. For example, a user could select a black-and-white image modification state for the oval subject area of a first area mode and a non-modified (color) image modification state for the background area. The user could also select a non-modified (color) image modification state for a square subject area of a second area mode and a black-and-white image modification state for the background area of the second mode. These two area modes would not be simultaneously possible. On the other hand, a user could simultaneously select a combination of either of these two area modes and an image modification state providing a distortion effect in the subject area.

The selector 20 can foreclose the selection of incompatible modes or incompatible image modification states by physical means, such as providing alternate settings for a single switch, or by appropriate software. The selector 20 can alternatively limit the user to only certain combinations, such as only allow the selection of a single area mode per alteration setting and a single image modification state per area. For ease of use, it is preferred that each alteration setting only have a single area mode and that the camera 10 require the user to select the area mode before or concurrent with selection of image modification states.

Referring now to FIGS. 8–12, the selector has an operator interface 28 that is accessible to the user and can be manipulated or otherwise actuated to switch the designators 22,24 and change alteration settings. It is highly preferred that the operator interface 28 have indicia identifying a selected alteration setting, and preferably, identifying the areas and respective image modification states of that alteration setting.

Figure 8:
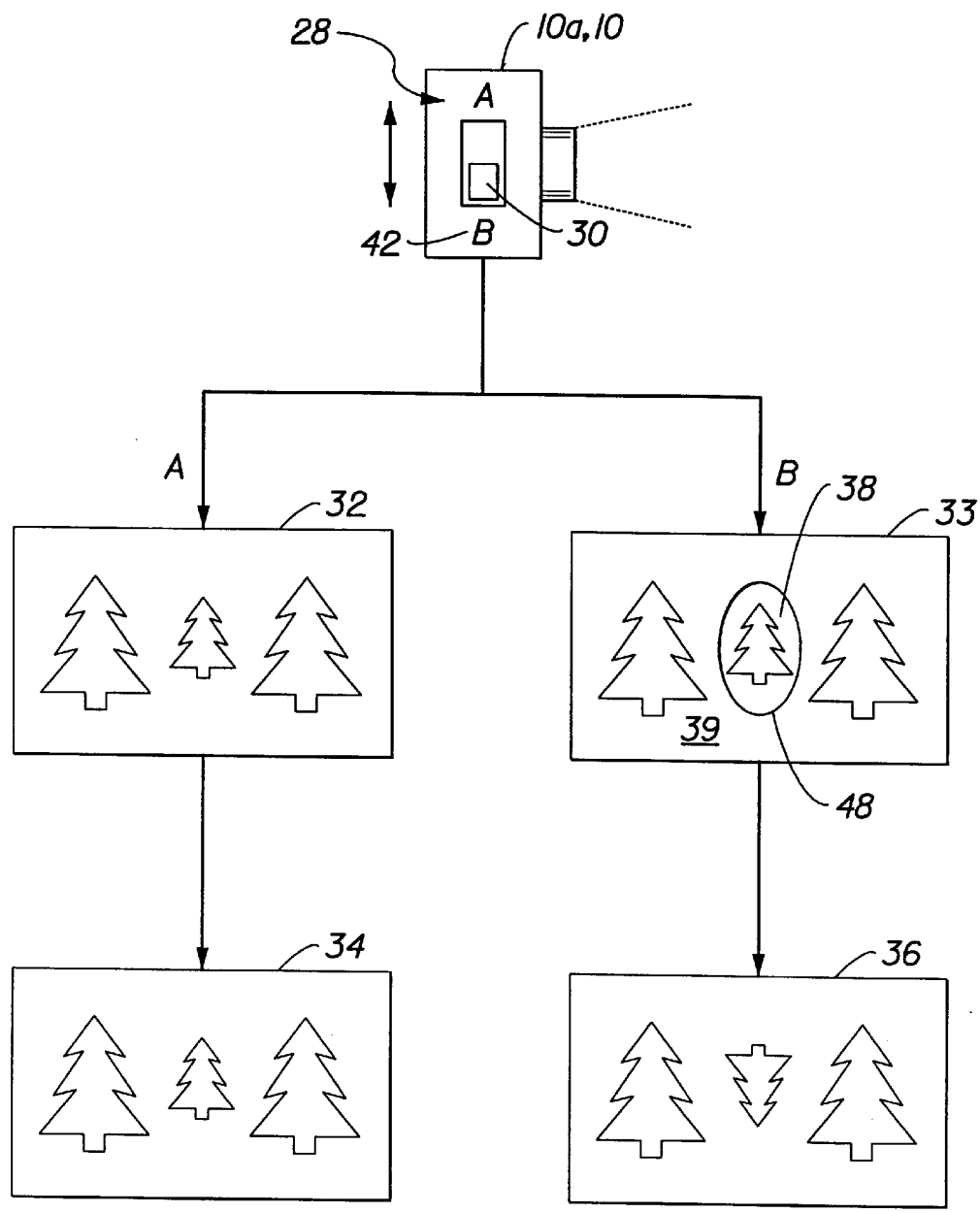
FIG. 8 is semi-diagrammatical view of another embodiment of the camera and alternative imaging sequences.

FIG. 8 shows the operator interface 28 of a one-time use camera 10a having a pair of fully predetermined alteration settings. The operator interface 28 has a button 30 that is movable between a first position labelled by the indicia "A" and a second position labelled by the indicia "B". Leading from the camera 10a in FIG. 8 is a branched arrow. Respective "A" and "B" branches show scene content in the viewfinder field 32,33 and the respective final images 34,36. In a first alteration setting (indicated by the letter "A"), the modification state is an unmodified state and the area mode is global. A second alteration setting (indicated by the letter "B"), has an area mode having a centered-vertical elliptical subject area. The modification state for the background area (indicated by reference numeral 39 ) is the unmodified state and the modification state for the oval subject area (indicated by reference numeral 38 ) is a 180 degree rotation of that portion of the image. The final images 34,36 show the unmodified scene for setting "A" and the scene subject to a 180 degree rotation in the centered-vertical elliptical area, respectively.

Figure 9:
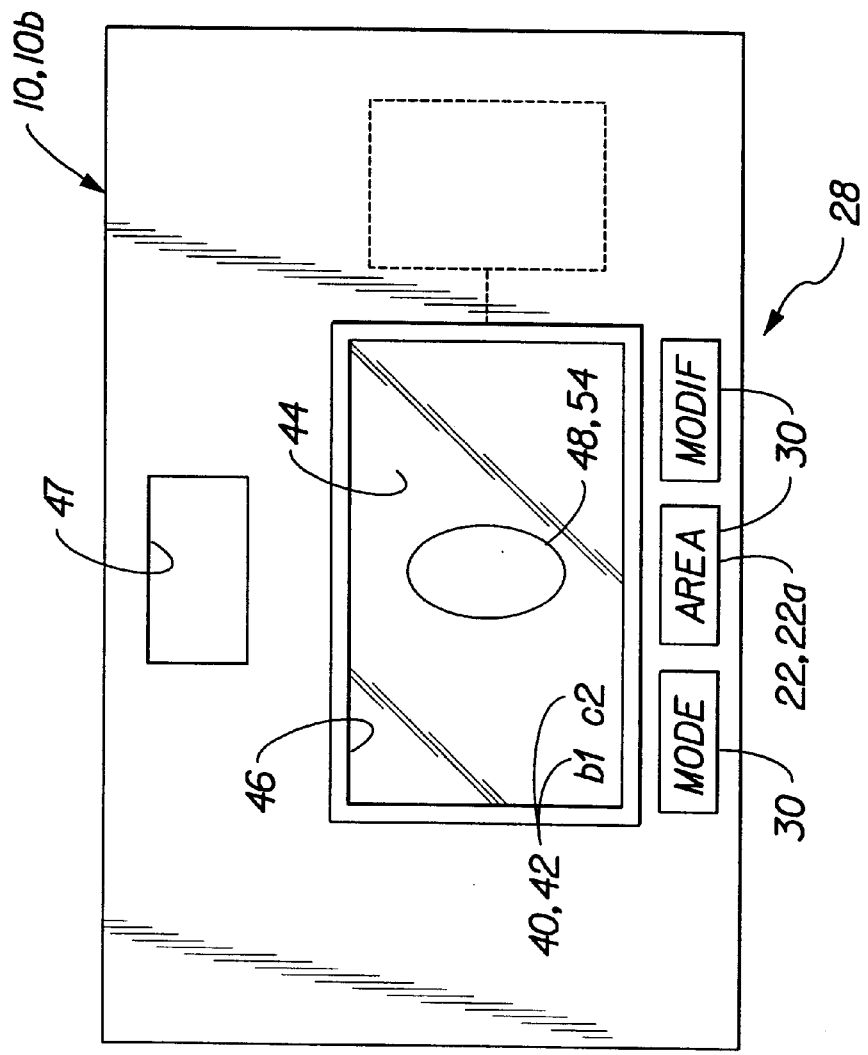
FIG. 9 is a semi-diagrammatical view of another embodiment of the camera.

FIG. 9 illustrates an operator interface of a reusable camera 10b having separate buttons 30 for selecting area modes, areas, and modification states and a liquid crystal display (LCD) 44 which indicates code elements of the currently selected alteration setting. Examples of suitable area modes and associated code elements 40 for this selector 20 are shown in FIGS. 2–7. The letters of the code elements overlie respective areas. Table 1 lists examples of suitable modification states and associated code elements. Alteration settings can be designated by a combination of code elements for the relevant areas and modification states.

TABLE 1

| Modification state | code |
| --- | --- |
| unmodified | 1 |
| monochrome | 2 |
| sepia tone | 3 |
| outline objects in image in black | 4 |
| "coloring book" (low resolution, small color palette) | 5 |
| "posterized" (full resolution, small color palette) | 6 |
| "oil painting" (textured canvas appearance) | 7 |
| enlarge to 150% of original | 8 |
| shrink to 66% of original | 9 |
| anamorphic distortion (first type) | 10 |
| anamorphic distortion (second type) | 11 |

TABLE 1-continued

| Modification state | code |
| --- | --- |
| anamorphic distortion (third type) | 12 |
| halo effect | 13 |
| star effect | 14 |

The operator interface 28 has indicia 42 identifying the alteration setting or user variable aspects of the alteration setting for the user. The nature of the indicia 42 and the operator interface 28 overall are not critical and can be varied to meet requirements such as camera cost. For example, the operator interface 28 can have indicia 42 in the form of molded or printed marks aligned with different positions of a toggle 30, as shown in FIG. 8. The indicia in this case identify two predefined alteration settings "A" and "B". The operator interface 28 can also be in the form of a display 44 and multiple buttons 30 or other actuators, as in the camera 10 shown in FIG. 9. In this case, the indicia 42 are indications, textual or graphic or both, on a liquid crystal display or other display unit. In FIG. 9, indicia 42 identify the current alteration setting as: "b1 c2". In this case, the alteration setting "b1 c2" also identifies the area mode "b c", the areas: "b" and "c", and the modification states associated with the areas: "1" and "2", respectively. The operator interface 28 can also take other forms; for example, buttons 30 can be replaced by a voice-actuation unit.

A selected alteration setting determines the area mode or modes and associated modification state or states for an ensuing capture event. Ordinarily, the ensuing capture event is the next picture taken. The alteration setting can stay selected until further user action or the selector 20 can revert to a default alteration setting after picture taking or, if desired, after a passage of time without picture taking. This can be accomplished in a variety of ways; for example, mechanically, by coupling the selector 20 to a film metering mechanism or other frame advance feature (not shown), or digitally, by appropriate software.

Referring now to FIG. 1, the encoder 26 records the alteration settings for respective images concurrent with the capturing of the images. It is highly preferred that the encodements be recorded in a manner that ensures that the encodements are retained with the captured images. This can be readily provided by recording the encodements on the capture member 18. The nature of the encoder 26 used and the type of encodement are not critical. For example, encodements can be recorded magnetically on magnetic recording media or magnetic recording regions; optically as latent images or changes in optical storage media; electronically in digital memory; by physical marking such as abrading or inking; or by other means. With digital capture members 18, it is preferred, for ease of use, that encodements be recorded so as to be readable from the capture member 18 in the same manner as the captured images. With film capture members 18, the encodements can conveniently be recorded in magnetic, optical, or digital form on a film holder or can conveniently be recorded as latent images on the film or magnetically on a magnetic layer or area of the film. With one-time use cameras 10, the encodements can be provided on the case 12 of the camera 10, but this is not preferred, since it presents a risk of loss of information if the capture member 18 and encodement are dissociated after the case 12 and capture member 18 have been separated.

The encodements each designate an alteration setting in a form that is accessible to automated processing equipment.

The information content of the encodements is not critical. The encodements can have the same information content as the indicia, and thus require use of one or more look-up tables or the equivalent to access appropriate algorithms for partitioning and modifying the respective image during digital processing. The encodements can instead each include necessary algorithms or information needed to generate the algorithms. The encodements can refer to partial or complete algorithms provided elsewhere in the capture unit. The selection of a particular approach is largely a matter of convenience and the recording capacity available for the encodements.

The encodements are recorded concurrent with image capture, rather than being prerecorded prior to usage of the camera 10 or capture member 18. This recording can be temporary and subject to later rerecording. For example, encodements can be initially captured in digital electronic memory and later be transferred to a magnetic film layer.

Referring now primarily to FIGS. 8–12, the camera 10 can be used with an ordinary viewfinder; however, this makes it difficult to compose modified pictures, since the user cannot see the region subject to alteration. It is therefore highly preferred that the camera 10 include a viewfinder 46 which has a locator 48 that indicates parts of the field of view that correspond with the areas of the selected area mode. With a camera 10 having a limited number of different area modes, the viewfinder 46 can include one or more demarcated regions that are present at all times. In this case, the user must ignore demarcations for area modes that are inappropriate for a particular setting.

Referring now particularly to FIGS. 9–12, in this embodiment, the camera 10c or 10d has a viewfinder 46 that displays a viewfinder field aligned with the image plane 16. Camera viewfinders known in the art, commonly display a field that is no larger than the camera's image plane, to ensure that all features in the viewfinder field will be captured. The viewfinder field is often smaller than the image plane to take into account manufacturing tolerances, camera size requirements, cost, and the like. The same considerations, well known to those of skill in the art, apply to the viewfinder 46 here.

Figure 10:
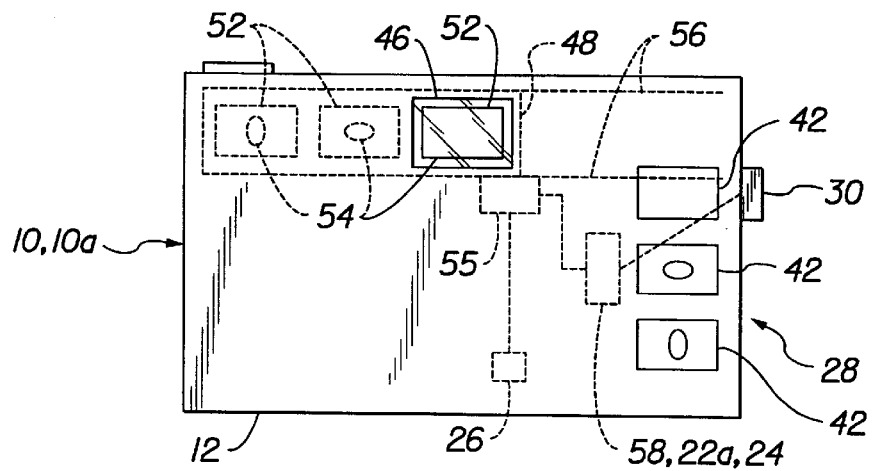
FIGS. 10–12 are semi-diagrammatical views of another embodiment of the camera.
Figure 11:
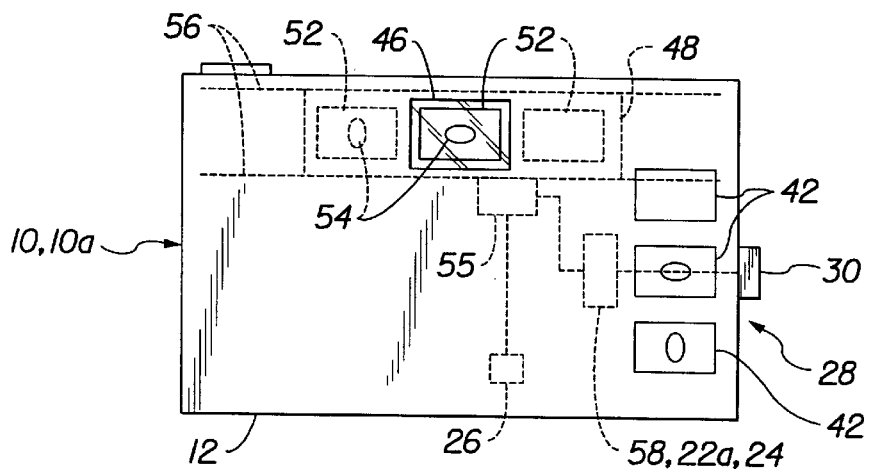
Figure 12:
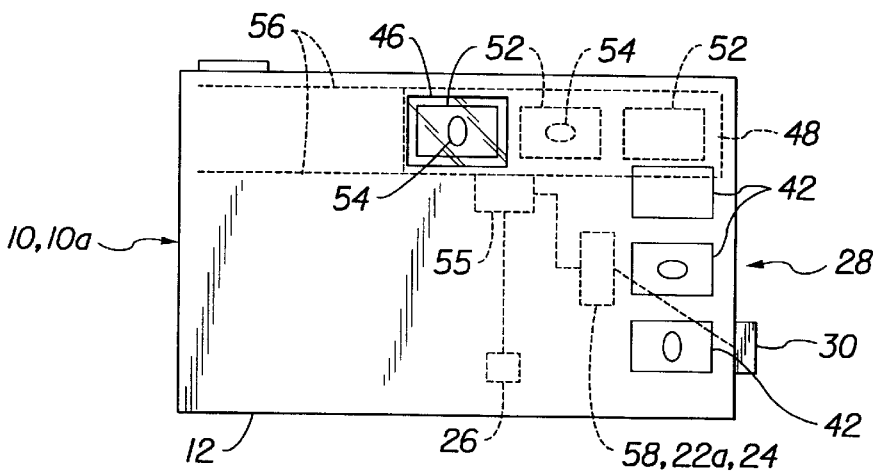
Figure 13:
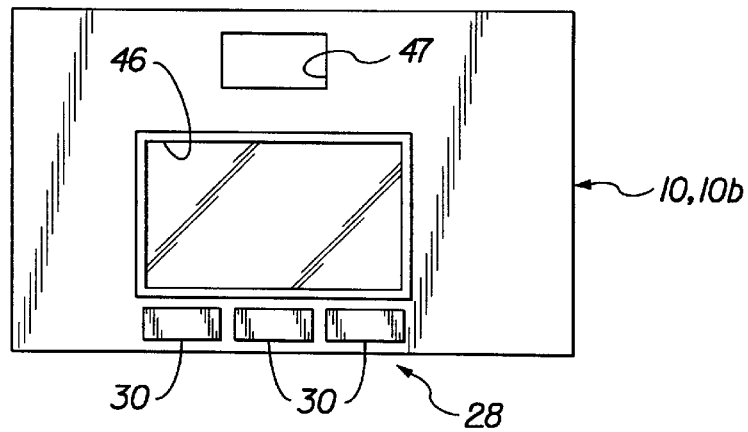
FIGS. 13–15 are reductions of the view of FIG. 9 showing the locator in three different positions.
Figure 14:
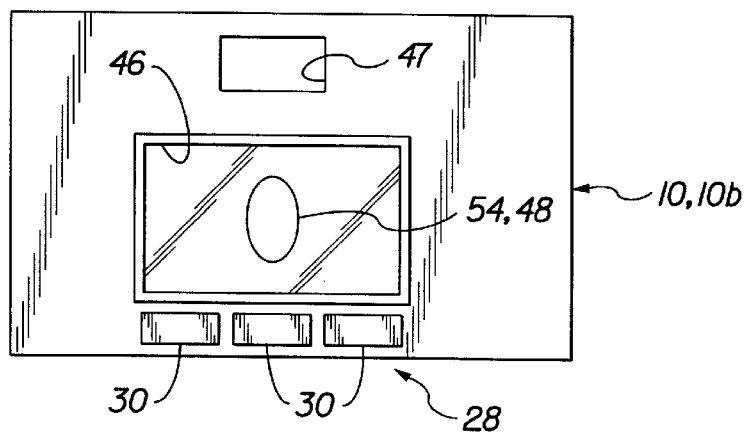
Figure 15:
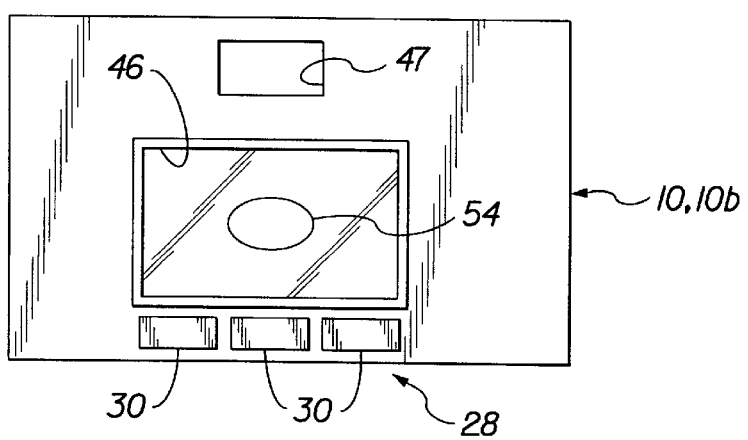

The viewfinder 46 can be optical, as shown in FIGS. 10–12, or can be provide an electronic representation of the viewfinder field, such as a digital representation on a liquid crystal display (LCD), as shown in FIG. 9. The camera 10 in FIG. 9 also includes an auxiliary optical viewfinder 47. The camera 10 has a switchable locator 48. The locator 48 can be a physical part that is movable relative to an optical viewfinder 46, as shown in FIGS. 10–12, or can be a similar set of digital representations in a digital viewfinder or on a digital display imposed on an optical viewfinder field, and the supporting programmed microprocessor or other controller 50, as shown in FIGS. 9 and 13–15.

The locator 48 is switchable between a primary position and one or more secondary positions. ("primary" and "secondary" are arbitrary designations) The selector 20 of the camera 10 has a partition designator 22a that is switchable between a primary area mode and one or more secondary area modes corresponding to the positions of the locator 48. The locator 48, in each secondary position, demarcates a partition of the viewfinder field into a plurality of areas matching areas of the image plane 16 designated in a particular secondary area mode. The locator 48, in the primary position, demarcates a partition of the viewfinder field into one or more areas. The corresponding primary area mode has a matching area or areas. The locator 48, in the primary position, can alternatively be out of the viewfinder field so that the viewfinder field defines a single area. The corresponding primary area mode likewise defines the image plane 16 as a single area.

The locator 48 indicates to the user the area or areas of the viewfinder field to compose prior to picture taking. The locator 48 can be as simple as one or more pointers arranged along the edge of the viewfinder field. It is preferred, however, that the locator 48 or the locator 48 in combination with the viewfinder 46, delineate the boundaries of all the areas in the selected area mode. The locator 48 can block out one or more areas, but it is preferred that all of the areas be viewable to allow the user to easily compose the picture for all of the areas. A preferred locator 48 has one or more line patterns 54, which are imposed in the viewfinder field to locate boundaries between areas. A line pattern 54 can be provided to indicate the outer boundaries of the area or areas, but this is superfluous unless the viewfinder field is noticeably larger than the image plane 16. With a mechanically movable locator 48, as shown in FIGS. 10–12, it is preferred that the line pattern 54 be present on a transparent reticle 52 or window 52.

The locator 48 and partition designator 22a can both be switchable independently of the other, but this is likely to be confusing for the user. For ease of use, the locator 48 should be operatively connected to the partition designator 22a so that the locator 48 and partition designator 22a switch, in tandem. The selector 20 is otherwise the same as previously described. For example, areas subject to image modification can be preset for a particular area mode or the partition designator 22a can be switchable to select areas for modification within a selected area mode. Alteration settings are recorded by the encoder 26 as previously described.

FIG. 8 illustrates the use of a camera 10 having a partition designator 22a that switches in tandem with a locator 48. The operator interface 28 of the selector 20 is movable between "A" and "B" positions. In the "A" position, the viewfinder field 32 demarcates a single area and the image modification state is no modification. The resulting final image 34, as printed or displayed, is a realistic representation of the original light image captured. In the "B" position, the locator 48 provides a line pattern 54 that defines an oval subject area 38 having an image modification state that does an inversion. The background area 39 has an image modification state that provides no modification. The resulting final image is a realistic representation of the original light image captured, except in the subject area, which is inverted. In position "B", as shown in FIG. 8, the effect of the image modification state is not shown in the viewfinder field. The viewfinder field can have indicia symbolizing the modification, such as the letter "B", or can have indicia actually showing the modification.

Referring now to FIGS. 10–12, the camera 10 has an optical viewfinder 46 and a locator 48 that is physically movable relative to the viewfinder 46 along a track 56 formed inside the case 12. The locator 48 has three reticles 52, each bearing a different line pattern 54. The first reticle 52 has a line pattern 54 that surrounds only a background region and thus demarcates an area mode having a single area. The second reticle 52 has a line pattern 54 demarcating an area mode having an oval subject area and a complementary background area. The oval has its major axis horizontal. The third reticle 52 has a line pattern 54 that demarcates another area mode having a different oval subject area and complementary background area. In the third reticle, the major axis of the oval is vertical. The locator 48 is movable relative to the viewfinder 46, by a motive device 55 such as a stepper motor or the like, to positions aligning the first, second, or third reticles 52 with the viewfinder 46. The partition designator 22a includes a three position switch 58. The image modifications are preset for each area mode (not illustrated in FIGS. 10–12 ), and, thus, the partition designator 22a is also the modification designator 24. The operator interface 28 includes a button 30 for the switch 58, that is movable relative to the camera 10 body 12 to change the position of the locator 48. The operator interface 28 includes indicia 42 on the camera body 12 which identify the different area modes corresponding to the partitions of the viewfinder field provided by the locator 48. An encoder 26, connected to the motive device 55, is actuated concurrent with image capture to record an alteration setting including the selected area mode.

Referring now to FIGS. 9 and 13–15, the camera 10 has an operator interface 28 including a digital display viewfinder 46. The locator 48 includes line patterns 54 corresponding to the line patterns of the reticles 52 of the camera shown in FIGS. 10–12. The line patterns are formed by a programmable computer that is operatively connected to the digital viewfinder 46 responsive to user selection. Suitable computer programs and algorithms for forming patterns on LCD panels and the like are well known. The partition designator 22a has separate buttons 30 for area mode ("Mode"), area, and modification ("Modif"). The viewfinder 46 displays indicia 42 for the selected alteration setting.

Figure 16A:
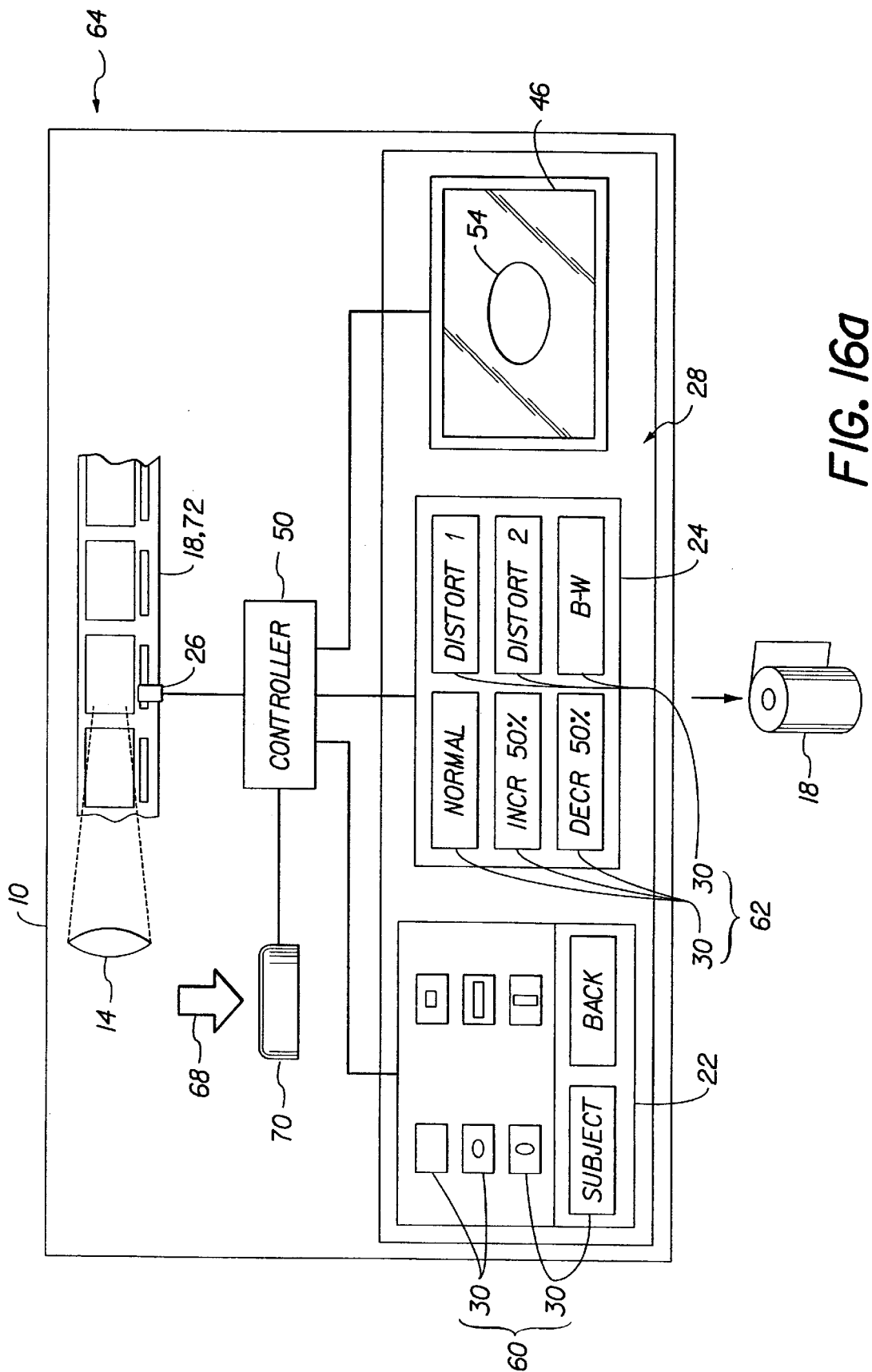
FIGS. 16a–16b are semi-diagrammatical views showing the system of the invention.

The camera 10 shown in FIG. 16a has an LCD panel viewfinder 46. The operator interface 28 also includes a keypad 60 for the area designator 22 and a second keypad 62 for the modification designator 24.

Figure 16B:
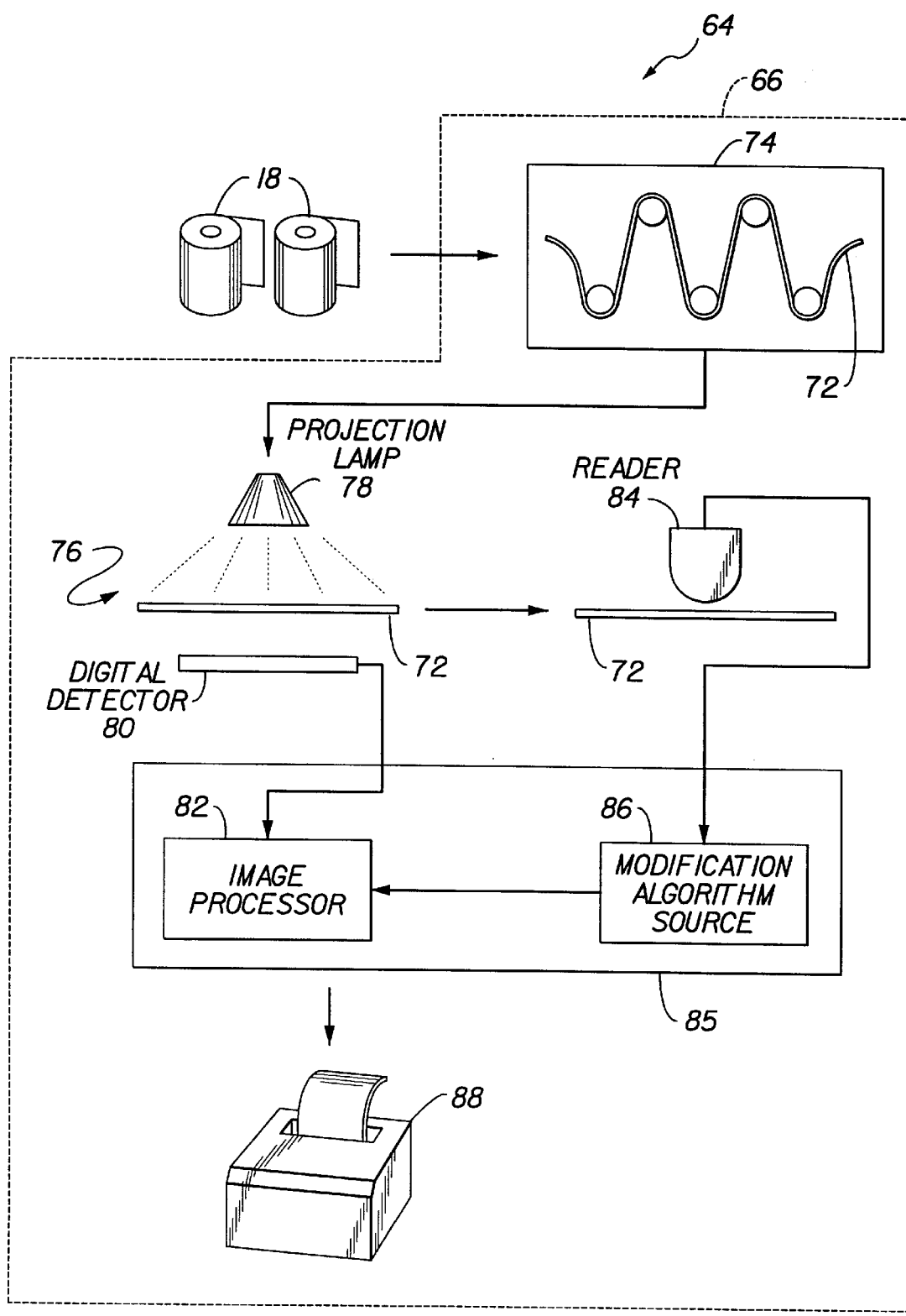

Referring to FIGS. 16a–16b, the system 64 includes one or more cameras 10, a plurality of capture members 18, and a processing unit 66 (indicated by a dashed line in FIG. 16b). The processing unit 66 visualizes the captured images as final images after digital modification in accordance with the image modification states and area modes of the respective setting designated at the time of image capture. The processing unit 66 can be a unitary apparatus or can be composed of several discrete components. Transfer of film and digital information can be by any convenient means including the use of local and remote computer networks. The system 64 and its method of operation are illustrated for cameras 10 in which the capture member 18 is a cassette of photographic film. A system 64 for use with digital capture members 18 and cameras 10 is comparable, but does not require components in the processing unit 66 for image digitization.

Referring to FIG. 16a, the user presses a button 30 on a keypad of the area designator 22 of the camera 10 and a signal is sent to the controller 50 causing the LCD panel viewfinder 46 to display a line pattern 54 identifying the selected area mode. The user can then press the "Subject" button 30 or "Back" button 30 to designate the subject area or background area. An image modification state is next selected by pressing one of the designated keys on a keypad of the modification designator 24: "Normal" (no modification), "Incr 50%" (increase size of the image in the area by 50%), "Decr 50%" (decrease the size of the image in the area by 50%), "Distort 1" (a first predefined distortion), "Distort 2" (a second predefined distortion), and "B-W" (black-and-white). The selecting is repeated for the other area. Image modification states can be identified by indicia in the viewfinder 46 or can be shown in the viewfinder 46. The light images are captured on the capture member 18. Capture is indicated in FIG. 16a by an arrow 68 directed toward a shutter button 70. Alteration settings are concurrently recorded by an encoder 26 onto a magnetic recording region or optical data recording region of the capture member 18. The capture member 18 is separated from the camera 10.

Referring now to FIG. 16b, capture units 18 are collected and the film 72 is developed in a film developer 74 to visualize the latent captured images on the film as film images. The film images are then digitized in a digital input unit 76 (illustrated in FIG. 16b as a projection lamp 78 and digital detector 80 ) to generate a series of digital images corresponding to the film images. The digital images are sent to an image processor 82. For each digital image, the alteration setting is read by a reader 84 and a corresponding setting signal is sent to a modification algorithm source 86, which communicates an appropriate image alteration signal to the image processor 82. The image processor 82 and modification algorithm source 86 can both be provided by a programmable computer 85. The image processor 82, responsive to respective image alteration signals, digitally modifies the digital images in accordance with the image modification states and area modes and sends an output signal to an output device 88 (illustrated in FIG. 16b as a printer). The display or hard copy from the output device 88 exhibits a final image in accordance with the alteration setting.

The invention has been described in detail with particular reference to certain preferred embodiments thereof, but it will be understood that variations and modifications can be effected within the spirit and scope of the invention.

What is claimed is:

1. A camera comprising:
   a taking lens;
   a capture member capturing and storing a series of images formed by said taking lens; and
   a selector switchable among:
      (a) a plurality of image modification states, and
      (b) a plurality of area modes, each said area mode partitioning an image plane into one or more areas, at least one of said area modes partitioning said image plane into two mutually exclusive areas,
   said selector being switchable to select a recordable capture setting for each of said images, each said capture setting identifying at least one of said area modes and at least one said image modification state associated with each said area of the respective said area mode.

2. The camera of claim 1 further comprising an electronic display operatively connected to said capture member and said selector, said display showing said areas of said image plane.

3. The camera of claim 2 wherein said display shows respective said modification states of said areas.

4. The camera of claim 3 wherein said display is a liquid crystal display.

5. The camera of claim 3 wherein said capture member captures electronic images.

6. The camera of claim 2 where said capture member is a digital memory card.

7. The camera of claim 2 wherein said display has a locator demarcating said areas.

8. The camera of claim 2 further comprising an encoder recording said capture settings concurrent with said capturing of respective said images.

9. The camera of claim 2 where said selector includes an area designator switchable between said areas to designate selected said areas; and a modification designator switchable among said image modification states to designate a selected state for each selected said area.

10. The camera of claim 2 wherein at least one of said area modes partitions the image plane into at least three mutually exclusive areas.

11. The camera of claim 2 wherein at least one of said areas is non-rectangular.

12. The camera of claim 2 wherein at least one of said capture settings includes localized image transmogrification.

13. The camera of claim 2 wherein at least one of said image modification states includes image aberration.

14. The camera of claim 2 wherein at least one of said image modification states includes anamorphic image distortion.

15. The camera of claim 2 wherein at least one of said image modification states includes color remapping.

16. The camera of claim 12 wherein at least one of said image modification states includes photomontage.

17. A camera comprising:

a taking lens defining an image plane;

a capture member capturing a series of images formed by said taking lens at said image plane;

a viewfinder displaying a viewfinder field corresponding to said image plane;

a locator switchable between a primary position and a secondary position relative to said viewfinder field, said locator demarcating, in said secondary position, a partition of said viewfinder field into a plurality of areas; and a selector switchable among a plurality of recordable capture settings, each said capture setting identifying at least one of a plurality of image modification states, at least one of said capture settings identifying said partition and associating different said image modification states with each of said areas.

18. The camera of claim 17 wherein said viewfinder displays an electronic representation of said viewfinder field.

19. The camera of claim 18 wherein said display is operatively connected to said locator and said selector and said display shows said areas of said image plane.

20. The camera of claim 19 wherein said display shows respective said modification states of said areas.

21. The camera of claim 17 wherein said locator is switchable among said primary position and a plurality of secondary positions, said secondary positions each partitioning said viewfinder field into a different plurality of areas.

22. The camera of claim 17 wherein said locator demarcates the entirety of said viewfinder field in said primary position.

23. The camera of claim 17 wherein at least one of said areas is non-rectangular.

24. The camera of claim 17 further comprising an encoder recording said capture settings concurrent with said capturing of respective said images.

25. The camera of claim 17 wherein said selector includes an area designator switchable between said areas to designate selected said areas; and a modification designator switchable among said image modification states to designate a selected state for each selected said area.

* * * * *